(12) United States Patent  
Takahashi et al.

(10) Patent No.: US 12,327,837 B2  
(45) Date of Patent: Jun. 10, 2025

(54) SULFIDE SOLID ELECTROLYTE

(71) Applicant: MITSUI MINING & SMELTING CO., LTD., Tokyo (JP)

(72) Inventors: Tsukasa Takahashi, Ageo (JP); Takashi Chikumoto, Ageo (JP); Yoichiro Ogata, Ageo (JP)

(73) Assignee: MITSUI MINING & SMELTING CO., LTD. (JP)

( * ) Notice: Subject to any disclaimer, the term of this patent is extended or adjusted under 35 U.S.C. 154(b) by 0 days.

(21) Appl. No.: 17/426,662

(22) PCT Filed: Sep. 3, 2020

(86) PCT No.: PCT/JP2020/033441  
§ 371 (c)(1),  
(2) Date: Jul. 29, 2021

(87) PCT Pub. No.: WO2021/049415  
PCT Pub. Date: Mar. 18, 2021

(65) Prior Publication Data  
US 2022/0109183 A1  Apr. 7, 2022

(30) Foreign Application Priority Data  
Sep. 11, 2019  (JP) .................................. 2019-165781

(51) Int. Cl.  
*H01M 10/0525* (2010.01)  
*C01B 25/14* (2006.01)  
(Continued)

(52) U.S. Cl.  
CPC ......... *H01M 10/0562* (2013.01); *C01B 25/14* (2013.01); *H01M 4/62* (2013.01);  
(Continued)

(58) Field of Classification Search  
CPC ......... H01M 10/0525; H01M 10/0562; H01M 4/62; H01M 2300/0068  
See application file for complete search history.

(56) References Cited

U.S. PATENT DOCUMENTS

| 2007/0160911 A1 | 7/2007 | Senga et al. |
| 2014/0363745 A1 | 12/2014 | Hirayama et al. |
| (Continued) | | |

FOREIGN PATENT DOCUMENTS

| JP | 2005-228570 A | 8/2005 |
| JP | 2012-94445 A | 5/2012 |
| (Continued) | | |

OTHER PUBLICATIONS

International Search Report (English and Japanese) of the International Searching Authority issued in PCT/JP2020/033441, mailed Nov. 17, 2020; ISA/JP (7 pages).

*Primary Examiner* — Osei K Amponsah  
(74) *Attorney, Agent, or Firm* — Harness, Dickey & Pierce, P.L.C.

(57) ABSTRACT

A sulfide solid electrolyte is provided having: diffraction peak A observed within a range of 2θ=20.0° to 24.0°; and diffraction peak B observed within a range of 2θ=24.4° to 26.4°, diffraction peak A and diffraction peak B being observed by performing X-ray diffraction measurement using CuKα1 radiation, and the ratio of $I_A$ to $I_B$, $I_A/I_B$, being 2.0 or less, wherein $I_A$ is an intensity of diffraction peak A and $I_B$ is an intensity of diffraction peak B. Preferably, the sulfide solid electrolyte contains elemental lithium, elemental phosphorus, elemental sulfur, and an elemental halogen. It is also preferable that the sulfide solid electrolyte has an argyrodite-type crystal structure. It is also preferable that the sulfide solid electrolyte contains a lithium halide hydrate.

10 Claims, 3 Drawing Sheets

(51) Int. Cl.
*H01M 4/62* (2006.01)
*H01M 10/0562* (2010.01)

(52) U.S. Cl.
CPC ..... *H01M 10/0525* (2013.01); *C01P 2002/30* (2013.01); *C01P 2002/72* (2013.01); *C01P 2002/74* (2013.01); *C01P 2006/40* (2013.01); *H01M 2300/0068* (2013.01)

(56) References Cited

U.S. PATENT DOCUMENTS

| | | | |
|---|---|---|---|
| 2016/0028104 A1 | 1/2016 | Liang et al. | |
| 2017/0040636 A1* | 2/2017 | Oki | H01M 10/0562 |
| 2018/0219229 A1 | 8/2018 | Miki | |
| 2018/0309167 A1* | 10/2018 | Kaga | H01M 4/661 |

FOREIGN PATENT DOCUMENTS

| | | |
|---|---|---|
| JP | 2013-030440 A | 2/2013 |
| JP | 2013-149599 A | 8/2013 |
| JP | 2016-024874 A | 2/2016 |
| JP | 2019-102263 A | 6/2019 |
| WO | 2018-131181 A1 | 7/2018 |
| WO | 2018-173940 A1 | 9/2018 |
| WO | 2019-131725 A1 | 7/2019 |

* cited by examiner

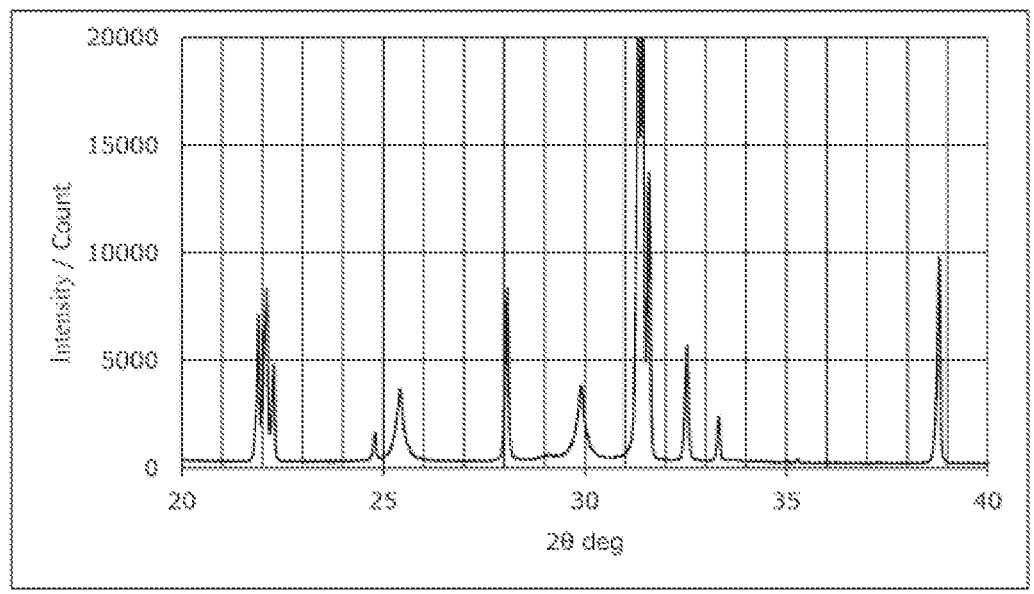

SULFIDE SOLID ELECTROLYTE

CROSS REFERENCE TO RELATED APPLICATIONS

This application is a U.S. National Phase Application under 35 U.S.C. 371 of International Application No. PCT/JP2020/33441, filed on Sep. 3, 2020, which claims priority to Japanese Patent Application No. 2019/165781, filed on Sep. 11, 2019. The entire disclosures of the above applications are expressly incorporated by reference herein.

BACKGROUND

Technical Field

The present invention relates to a sulfide solid electrolyte. Also, the present invention relates to an electrode mixture and a solid-state battery that contain the sulfide solid electrolyte.

Related Art

Solid-state batteries do not use flammable organic solvents, and thus allow for simplification of safety devices. Moreover, solid-state batteries not only can be excellent in terms of production cost and productivity but also have the characteristic of being able to be stacked in series within a cell to achieve a higher voltage.

As a type of solid electrolyte that is used in a solid-state battery, a sulfide solid electrolyte has been researched. However, there is a problem with a solid-state battery that contains a sulfide solid electrolyte in that, as the solid-state battery is charged and discharged, reaction resistance between an active material and the sulfide solid electrolyte increases, thus limits transportation of lithium ions, and consequently causes a deterioration in battery characteristics. It is believed that the reason for this is that a resistive layer is formed at an interface between the active material and the sulfide solid electrolyte due to the reaction therebetween. To address this problem, for example, US 2018/219229A1 discloses an attempt to restrain an increase in reaction resistance by coating the surface of a positive electrode active material with a specific compound. JP 2012-94445A discloses an attempt to restrain formation of a high-resistance section by forming an oxide layer on a surface of a sulfide solid electrolyte material, the oxide layer resulting from oxidation of the sulfide solid electrolyte material itself. WO 2018/131181A discloses an ionic conductor that has, between a plurality of oxide-based lithium ionic conductor particles, regions where a halogenated lithium is present.

However, the technology disclosed in US 2018/219229A1 employs an expensive substance such as lithium niobate, lithium titanate, lithium lanthanum zirconate, lithium tantalate, or lithium tungstate as the compound that coats the surface of the positive electrode active material. According to JP 2012-94445A, moisture should be avoided as much as possible during exposure to the atmosphere for forming the oxide layer, and furthermore, even a drying step is needed. Therefore, the technologies disclosed in the above-described literatures cannot be said to be economically advantageous, and are impractical.

Thus, an object of the present invention is to provide a sulfide solid electrolyte with which favorable battery characteristics can be obtained.

SUMMARY

The present invention achieves the object by providing a sulfide solid electrolyte having: diffraction peak A observed within a range of 2θ=20.0° to 24.0°; and diffraction peak B observed within a range of 2θ=24.4° to 26.4°, diffraction peak A and diffraction peak B being observed by performing X-ray diffraction measurement using CuKα1 radiation, and a ratio of $I_A$ to $I_B$, $I_A/I_B$, being 2.0 or less, wherein $I_A$ is an intensity of diffraction peak A and $I_B$ is an intensity of diffraction peak B.

Also, the present invention provides an electrode mixture that contains a sulfide solid electrolyte and an active material, wherein, the sulfide solid electrolyte has: diffraction peak A observed within a range of 2θ=20.0° to 24.0°; and diffraction peak B observed within a range of 2θ=24.4° to 26.4°, diffraction peak A and diffraction peak B being observed by performing X-ray diffraction measurement using CuKα1 radiation, and a ratio of $I_A$ to $I_B$, $I_A/I_B$, being 2.0 or less, wherein $I_A$ is an intensity of diffraction peak A and $I_B$ is an intensity of diffraction peak B.

Furthermore, the present invention provides a solid electrolyte layer that contains the above-described solid electrolyte or the above-described electrode mixture.

Furthermore, the present invention provides a solid-state battery that contains the above-described solid electrolyte or the above-described electrode mixture.

BRIEF DESCRIPTION OF THE DRAWINGS

FIG. 5 is a chart showing an XRD measurement result of a solid electrolyte obtained in Comparative Example 5.

DETAILED DESCRIPTION

Figure 1:
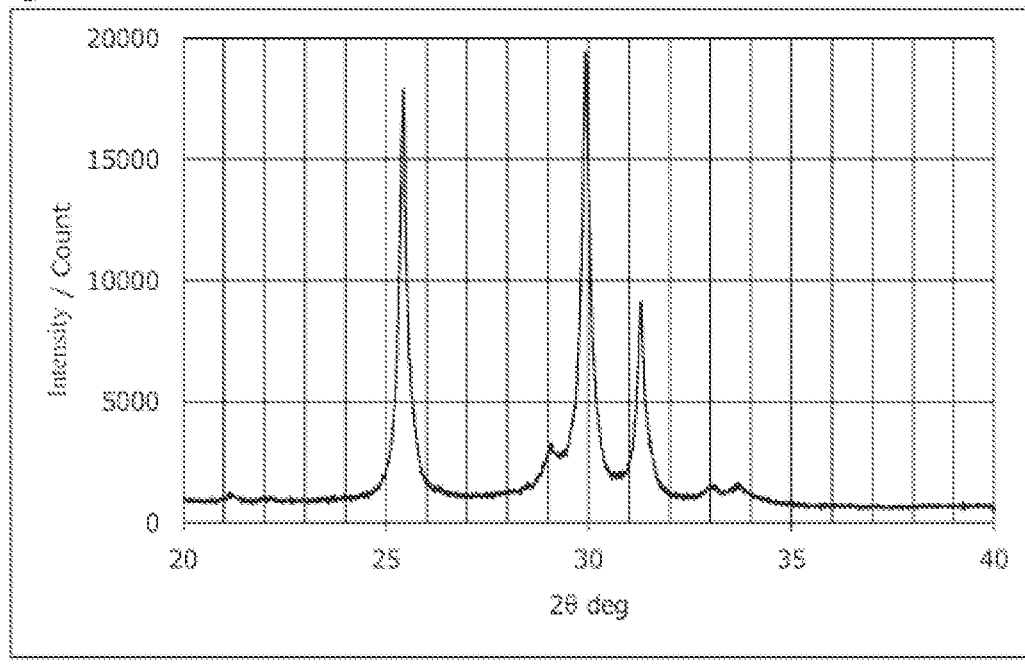
FIG. 1 is a chart showing an XRD measurement result of a solid electrolyte obtained in Example 1.
Figure 2:
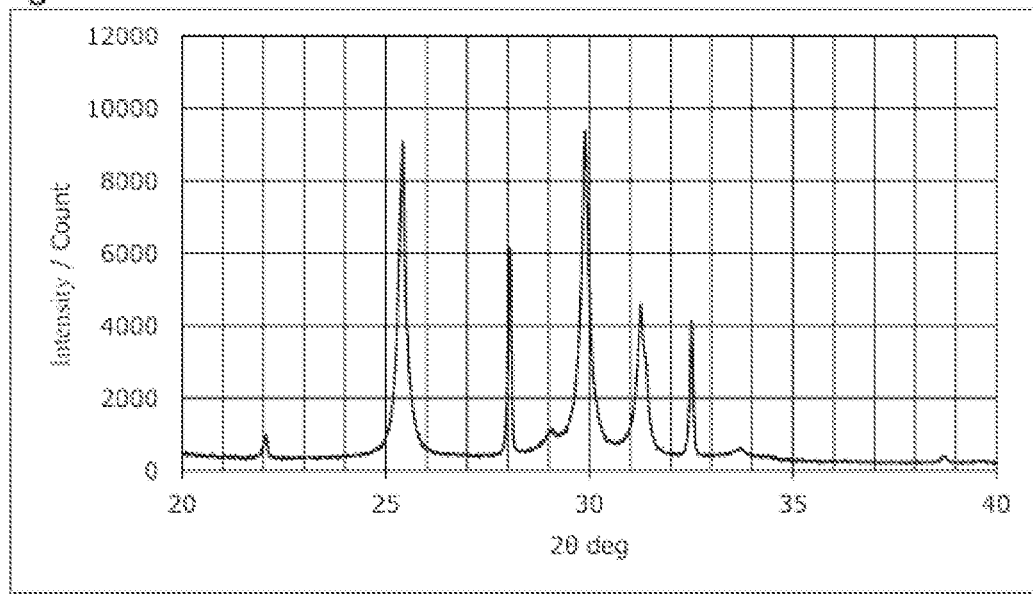
FIG. 2 is a chart showing an XRD measurement result of a solid electrolyte obtained in Example 7.
Figure 3:
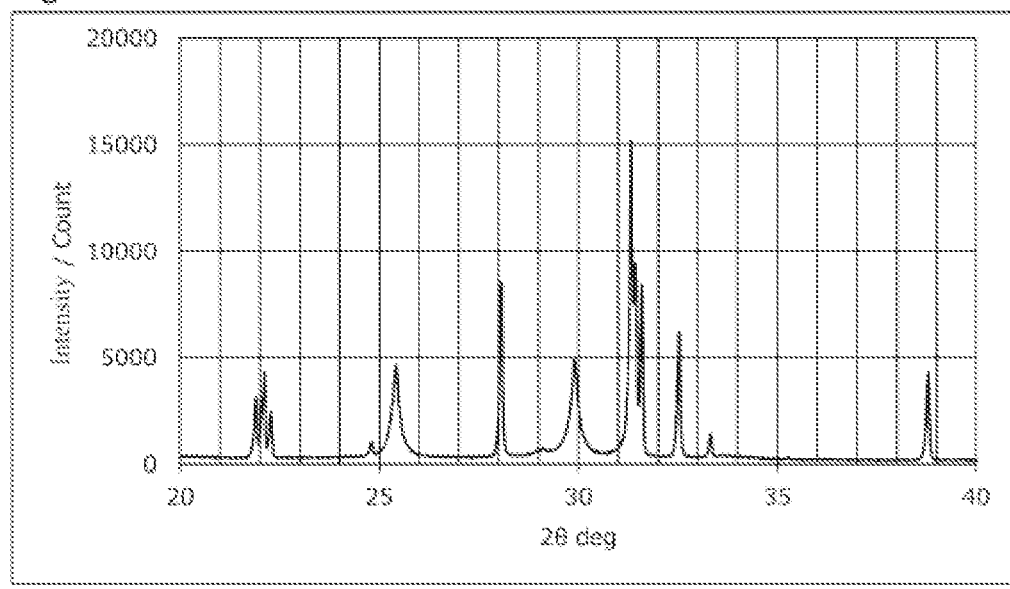
FIG. 3 is a chart showing an XRD measurement result of a solid electrolyte obtained in Example 8.
Figure 4:
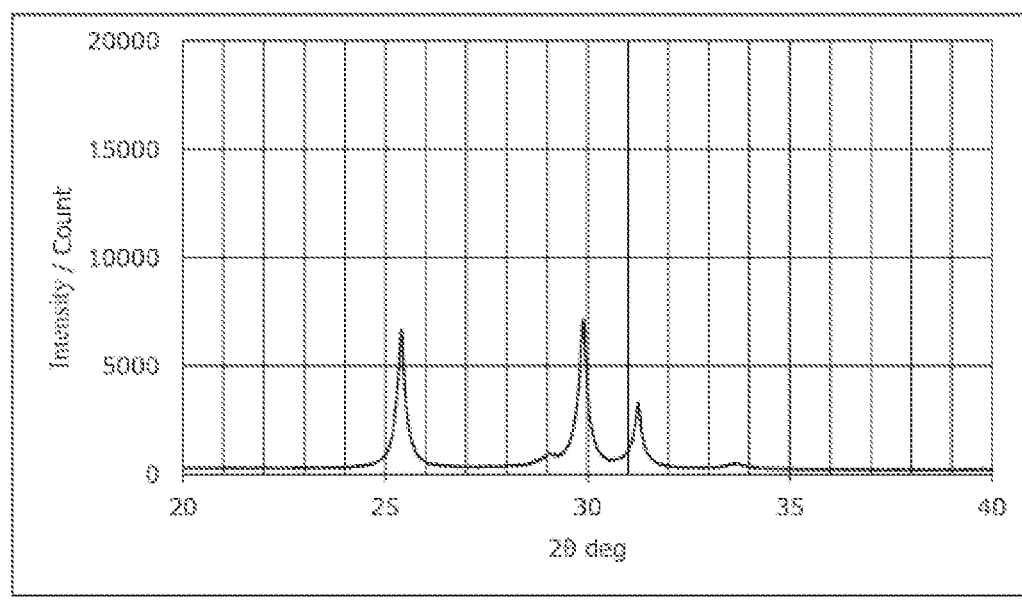
FIG. 4 is a chart showing an XRD measurement result of a solid electrolyte obtained in Comparative Example 4.

Hereinafter, the present invention will be described based on preferred embodiments thereof. A solid electrolyte of the present invention contains a sulfide solid electrolyte. Also, the solid electrolyte of the present invention has lithium ionic conductivity. Lithium ionic conductivity is measured using the following method. A solid electrolyte is formed in a ceramic cylinder (having a diameter of 10 mm) through uniaxial pressing within a glove box purged with a sufficiently dried Ar gas (having a dew point of −60° C. or less). The formed solid electrolyte is sandwiched between hard-chromium-plated SUS punches having a diameter of 10 mm, the punches respectively being placed on upper and lower surfaces of the solid electrolyte and serving as electrodes. The solid electrolyte and the punches are fixed at four points using M6-size bolts and nuts with a tightening torque of 6 N·m. Thus, an ionic conductivity measurement sample in which the solid electrolyte has a thickness of 0.4 to 1.0 mm is prepared. The ionic conductivity of the sample is measured using a frequency response analyzer Model 1260A manufactured by Solartron. The measurement is performed using an AC impedance method under conditions at a temperature of 25° C. and over a frequency range from 0.1 Hz to 1 MHz.

The sulfide solid electrolyte contained in the solid electrolyte of the present invention contains sulfur as a constituent element thereof. The lithium ionic conductivity of the solid electrolyte of the present invention results from the sulfide solid electrolyte. Various sulfide solid electrolytes that have lithium ionic conductivity are known in the art, and those various sulfide solid electrolytes can be used in the present invention without limitation. In particular, from the viewpoint of reducing the reaction resistance between the sulfide solid electrolyte and an active material, it is advantageous that the sulfide solid electrolyte contains elemental lithium (Li), elemental phosphorus (P), elemental sulfur (S), and an elemental halogen (X). From the viewpoint of reducing the reaction resistance between the sulfide solid electrolyte and an active material even further, it is advantageous that the elemental halogen contains at least one of elemental chlorine (Cl), elemental bromine (Br), and elemental iodine (I). Such a sulfide solid electrolyte may also contain another element in addition to elemental lithium, elemental phosphorus, elemental sulfur, and the elemental halogen. For example, a portion of elemental lithium may be replaced with another elemental alkali metal, a portion of elemental phosphorus may be replaced with another elemental pnictogen, and a portion of elemental sulfur may be replaced with another elemental chalcogen.

When the solid electrolyte of the present invention is subjected to X-ray diffraction (hereinafter also referred to as "XRD") measurement using CuKα1 radiation, diffraction peak A is observed within a range of $2\theta=20.0°$ to $24.0°$. As a result of research by the inventors of the present invention, it was found that the reaction resistance between an active material and a solid electrolyte for which diffraction peak A is observed within this range of angles is lower than that between the active material and a conventional solid electrolyte. Therefore, a solid-state battery that contains the solid electrolyte of the present invention has a high discharge capacity and favorable discharge rate characteristics. The details of the XRD measurement will be provided in Examples, which will be described later.

From the viewpoint of even more markedly realizing the above-described advantageous effects, in the case where the solid electrolyte of the present invention contains elemental lithium (Li), elemental phosphorus (P), elemental sulfur (S), and elemental chlorine (Cl), it is preferable that diffraction peak A is observed within a range of, for example, $2\theta=21.0°$ to $24.0°$, more preferably $21.5°$ to $23.7°$, and even more preferably $22.5°$ to $23.5°$. On the other hand, in the case where the solid electrolyte of the present invention contains elemental lithium (Li), elemental phosphorus (P), elemental sulfur (S), and elemental bromine (Br), it is preferable that diffraction peak A is observed within a range of $2\theta=20.0°$ to $23.5°$, more preferably $20.5°$ to $23.3°$, and even more preferably $21.5°$ to $23.0°$.

As a result of research by the inventors of the present invention, it was found that the diffraction peak that is observed within the above-described range of angles is not derived from a sulfide. The inventors of the present invention conducted further research and found that the diffraction peak that is observed within the above-described range of angles is derived from a lithium halide hydrate. Specifically, it was found that the diffraction peak that is observed within the above-described range of angles is derived from (010), (001), or (200) of the lithium halide hydrate. In view of this, it is preferable that the solid electrolyte of the present invention contains both a lithium halide hydrate and a sulfide. Accordingly, it is preferable that the solid electrolyte of the present invention contains elemental lithium (Li), elemental phosphorus (P), elemental sulfur (S), an elemental halogen (X), and elemental oxygen (O).

The reason why favorable battery characteristics can be obtained by using a solid electrolyte that contains a lithium halide hydrate and a sulfide is not completely elucidated. On the other hand, the inventors of the present invention regard the reduction in reaction resistance between the sulfide solid electrolyte and the active material as one of the factors that contribute to the above-described effects. Specifically, the inventors of the present invention think that the reason may possibly be because the lithium halide hydrate reduces a barrier to the transfer of lithium ions between the sulfide solid electrolyte and the active material; however, the scope of the present invention is not restricted by this theory.

As described above, it is preferable that the sulfide solid electrolyte contains elemental lithium, elemental phosphorus, elemental sulfur, and an elemental halogen. In this case, the type of the elemental halogen contained in the sulfide solid electrolyte and the type of the elemental halogen contained in the lithium halide hydrate may be the same or different from each other. Preferably, the elemental halogen contained in the lithium halide hydrate is at least one elemental halogen selected from, for example, chlorine, bromine, and iodine. In addition, the number of waters of hydration contained in the lithium halide hydrate may be one or two or more. As a result of research by the inventors of the present invention, it was confirmed that satisfactory results can be obtained by using a monohydrate.

It is also preferable that, when the solid electrolyte of the present invention is subjected to XRD measurement using CuKα1 radiation, diffraction peak B is observed within a range of $2\theta=24.4°$ to $26.4°$, in addition to the diffraction peak observed in the above-described range of angles. With this solid electrolyte, the reaction resistance between the solid electrolyte and the active material is reduced even further. As a result, a solid-state battery that contains the solid electrolyte of the present invention has an even higher discharge capacity and even more favorable discharge rate characteristics. From the viewpoint of even more markedly realizing these effects, it is more preferable that diffraction peak B of the solid electrolyte of the present invention is observed within a range of, for example, $2\theta=24.8°$ to $26.2°$, even more preferably $25.0°$ to $25.8°$, and yet even more preferably $25.2°$ to $25.6°$.

When both diffraction peak A and diffraction peak B are observed for the solid electrolyte of the present invention, it is preferable that the ratio of $I_A$ to $I_B$, $I_A/I_B$, wherein $I_A$ is the intensity of diffraction peak A and $I_B$ is the intensity of diffraction peak B, is 2.0 or less, because the reaction resistance between the solid electrolyte and the active material is reduced. For the same reason, $I_A/I_B$ is preferably more than 0, for example. Moreover, $I_A/I_B$ is, for example, preferably 1.5 or less, more preferably 1.0 or less, even more preferably 0.5 or less, and yet even more preferably 0.1 or less.

In order to make diffraction peak A and diffraction peak B be observed for the solid electrolyte of the present invention, for example, a method can be employed in which the sulfide solid electrolyte is exposed to a water-containing atmosphere for a predetermined period of time. When this method is employed, water in the atmosphere and the sulfide solid electrolyte react with each other and produce a lithium halide hydrate, and consequently, a solid electrolyte that contains the sulfide solid electrolyte and the lithium halide hydrate can be obtained. With regard to the conditions under which the sulfide solid electrolyte is exposed to the water-containing atmosphere, if the exposure temperature is, for example, (dew point −30° C.), the exposure time is, for example, preferably from 15 to 85 hours, more preferably from 20 to 80 hours, and even more preferably from 24 to 72 hours. It is preferable that the water content of the sulfide solid electrolyte that is to be placed in the water-containing atmosphere is controlled so as to be 5 mass % or less before the sulfide solid electrolyte comes into contact with the water-containing atmosphere.

The inventors of the present invention confirmed that exposure of a sulfide solid electrolyte to a water-containing atmosphere produces, in addition to a lithium halide hydrate, an anhydrous lithium halide, lithium carbonate, and an unidentified substance. The inventors of the present invention confirmed that, among these products, the lithium halide hydrate contributes the most to the reduction of reaction resistance between the sulfide solid electrolyte and an active material.

As another method for making the diffraction peaks within the above-described ranges of angles be observed for the solid electrolyte of the present invention, a method may be employed in which the sulfide solid electrolyte is mixed with a compound that contains water of crystallization. With this method, water that is released from the compound containing water of crystallization reacts with the sulfide solid electrolyte and thereby produces a lithium halide hydrate, and consequently, a solid electrolyte that contains the sulfide solid electrolyte and the lithium halide hydrate can be obtained. From the viewpoint of reliably producing the lithium halide hydrate, it is advantageous that mixing of the sulfide solid electrolyte with the compound that contains water of crystallization involves grinding. A known grinding means such as, for example, a ball mill or a bead mill can be used to perform the grinding.

There is no particular limitation on the compound that contains water of crystallization, and various compounds can be used as long as the compounds do not impair the properties of the sulfide solid electrolyte. As a hydrated salt of an organic compound, any hydrated salts of common organic compounds can be used without limitation. An example thereof is a hydrated salt of a carboxylic acid. Examples of the hydrated salt of a carboxylic acid include: straight-chain saturated fatty acids, such as hydrated salts of formic, acetic, propionic, butyric, valeric, caproic, enanthic, capric, pelargonic, lauric, myristic, palmitic, stearic, eicosanoic, behenic, montanic, and triacontanoic acids; fatty acid derivatives, such as a hydrated salt of 1,2-hydroxystearic acid; aliphatic dicarboxylic acids, such as hydrated salts of oxalic, fumaric, maleic, succinic, glutaric, adipic, pimelic, suberic, azelaic, sebacic, undecanedioic, and dodecanedioic acids; hydroxy acids, such as hydrated salts of glycolic, lactic, hydroxybutyric, tartaric, malic, citric, isocitric, and mevalonic acids; aromatic carboxylic acids, such as hydrated salts of benzoic, terephthalic, isophthalic, orthophthalic, pyromellitic, trimellitic, xylylenedicarboxylic, and naphthalenedicarboxylic acids; and the like. On the other hand, as a hydrated salt of an inorganic compound, any hydrated salts of common inorganic compounds can be used without limitation. Examples include: halide hydrates, oxide hydrates, nitride hydrates, carbide hydrates, boride hydrates, and the like. Of these hydrates, hydrates that contain an alkali metal are preferable, and a halide hydrate that contains an alkali metal is particularly preferable. One type of these compounds may be used alone, or two or more types may be used in combination. The mixing ratio between the sulfide solid electrolyte and the compound that contains water of crystallization can be adjusted so that the lithium halide hydrate can be produced in such an amount that can reduce the reaction resistance. Note that the water content of the sulfide solid electrolyte that is to be mixed with the compound that contains water of crystallization is preferably controlled so as to be 5 mass % or less before the sulfide solid electrolyte is mixed with the compound.

As yet another method for making the diffraction peaks within the above-described ranges of angles be observed for the solid electrolyte of the present invention, a method may also be employed in which the above-described exposure of the sulfide solid electrolyte to a water-containing atmosphere and the above-described mixing with a compound that contains water of crystallization are combined.

As described above, the solid electrolyte of the present invention contains a lithium halide hydrate. Whether or not the solid electrolyte of the present invention contains a lithium halide hydrate can be judged by whether or not a reduction in weight is observed in thermogravimetry of the solid electrolyte. Specifically, if a reduction in weight is observed when the solid electrolyte is heated from 25° C. to 400° C., the reduction in weight is judged to be caused by elimination of water from a lithium halide hydrate. Thus, the solid electrolyte is judged to contain a lithium halide hydrate. It is preferable that, in thermogravimetry, the weight loss rate within the above-described temperature range is preferably from 2.7% to 11.0%, more preferably from 4.0% to 10.0%, and even more preferably from 6.0% to 8.0%, because the reaction resistance between the solid electrolyte and the active material is reduced even further. Thermogravimetry is performed at a heating rate of 10° C./min in an Ar atmosphere. For example, TG-DTA2000SA manufactured by MAC Science can be used to perform the measurement.

A particularly preferable sulfide solid electrolyte that can be used in the present invention is a material that contains a crystalline phase having an argyrodite-type crystal structure, from the viewpoint of reducing the reaction resistance between the sulfide solid electrolyte and the active material even further. An argyrodite-type crystal structure refers to a crystal structure possessed by a group of compounds derived from a mineral represented by the chemical formula $Ag_8GeS_6$. From the viewpoint of reducing the reaction resistance between the sulfide solid electrolyte and the active material yet even further, it is particularly preferable that the sulfide solid electrolyte having an argyrodite-type crystal structure has a crystal structure belonging to that of cubic crystals.

In the sulfide solid electrolyte that contains a crystalline phase having an argyrodite-type crystal structure, at least one element of, for example, elemental fluorine (F), elemental chlorine (Cl), elemental bromine (Br), and elemental iodine (I) can be used as the elemental halogen (X) contained in the sulfide solid electrolyte. From the viewpoint of improving ionic conductivity, it is particularly preferable to use a combination of elemental chlorine and elemental bromine as the elemental halogen.

From the viewpoint of improving the ionic conductivity even more, it is particularly preferable that the sulfide solid electrolyte that contains a crystalline phase having an argyrodite-type crystal structure is, for example, a compound represented by the compositional formula (I): $Li_aPS_bX_c$, wherein X represents at least one of elemental fluorine (F), elemental chlorine (Cl), elemental bromine (Br), and elemental iodine (I). Preferably, X is one or both of elemental chlorine (Cl) and elemental bromine (Br).

In the above-described compositional formula (I), a represents the molar ratio of elemental lithium and is preferably from 3.0 to 6.5, more preferably from 3.5 to 6.3, and even more preferably from 4.0 to 6.0. When a is within this range, the cubic argyrodite-type crystal structure is stable at temperatures near room temperature (25° C.), and the lithium ionic conductivity can be increased.

In the compositional formula (I), b represents a value indicating how much smaller the amount of the $Li_2S$ component is than that in the stoichiometric composition. It is preferable that b is from 3.5 to 5.5, more preferably from 4.0 to 5.3, and even more preferably from 4.2 to 5.0, because the cubic argyrodite-type crystal structure is stable at temperatures near room temperature (25° C.) and the lithium ionic conductivity is increased.

In the compositional formula (I), c is preferably from 0.1 to 3.0, more preferably from 0.5 to 2.5, and even more preferably from 1.0 to 1.8.

Alternatively, the sulfide solid electrolyte that contains a crystalline phase having an argyrodite-type crystal structure may also be, for example, a compound represented by the compositional formula (II): $Li_{7-d}PS_{6-d}X_d$. A composition represented by the compositional formula (II) is the stoichiometric composition of an argyrodite-type crystalline phase. In the compositional formula (II), X is as defined in the compositional formula (I).

In the compositional formula (II), d is preferably from 0.4 to 2.2, more preferably from 0.8 to 2.0, and even more preferably from 1.2 to 1.8.

Furthermore, the sulfide solid electrolyte that contains a crystalline phase having an argyrodite-type crystal structure may also be, for example, a compound represented by the compositional formula (III): $Li_{7-d-2e}PS_{6-d-e}X_d$. An argyrodite-type crystalline phase that has a composition represented by the formula (III) is, for example, produced by the reaction of an argyrodite-type crystalline phase that has a composition represented by the formula (II) with $P_2S_5$ (diphosphorus pentasulfide). The reaction equation is as follows:

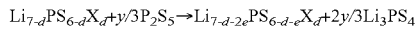

$$Li_{7-d}PS_{6-d}X_d + y/3 P_2S_5 \rightarrow Li_{7-d-2e}PS_{6-d-e}X_d + 2y/3 Li_3PS_4$$

As indicated by the reaction equation, a $Li_3PS_4$ phase is produced along with the argyrodite-type crystalline phase represented by the compositional formula (III). In addition, there are cases where a trace amount of a LiX phase is produced, where X is at least one of elemental fluorine (F), elemental chlorine (Cl), elemental bromine (Br), and elemental iodine (I). In the compositional formula (III), X and d are as defined in the compositional formula (II).

In the compositional formula (III), e is a value that indicates a deviation of the $Li_2S$ component from the stoichiometric composition represented by the compositional formula (II). e is preferably from −0.9 to (−d+2), more preferably from −0.6 to (−d+1.6), and even more preferably from −0.3 to (−d+1.0).

In the compositional formula (I), (II), or (III), a portion of P may be replaced with at least one element, or two or more elements, of Si, Ge, Sn, Pb, B, Al, Ga, As, Sb, and Bi. In this case, the compositional formula (I) becomes $Li_a(P_{1-y}M_y)S_bX_c$, the compositional formula (II) becomes $Li_{7-d}(P_{1-y}M_y)S_{6-d}X_d$, and the compositional formula (III) becomes $Li_{7-d-2e}(P_{1-y}M_y)S_{6-d-e}X_d$. M is one or two or more elements selected from Si, Ge, Sn, Pb, B, Al, Ga, As, Sb, and Bi. y is preferably from 0.01 to 0.7, more preferably from 0.02 to 0.4, and even more preferably from 0.05 to 0.2.

Whether or not a sulfide solid electrolyte contains a crystalline phase having an argyrodite-type crystal structure can be confirmed by performing XRD measurement, for example. That is to say, in an XRD measurement that is performed with an X-ray diffractometer (XRD) using CuKα1 radiation, a crystalline phase having an argyrodite-type structure has characteristic peaks at 2θ=15.34°±1.00°, 17.74°±1.00°, 25.19°±1.00°, 29.62°±1.00°, 30.97°±1.00°, 44.37°±1.00°, 47.22°±1.00°, and 51.70°±1.00°. Furthermore, a crystalline phase having an argyrodite-type structure also has characteristic peaks at, for example, 2θ=54.26°±1.00°, 58.35°±1.00°, 60.72°±1.00°, 61.50°±1.00°, 70.46°±1.00°, and 72.61°±1.00°. On the other hand, if a sulfide solid electrolyte does not contain a crystalline phase having an argyrodite-type structure, this can be confirmed by checking that the sulfide solid electrolyte does not have the above-described peaks characteristic of a crystalline phase having an argyrodite-type structure.

A sulfide solid electrolyte having an argyrodite-type crystal structure means that the sulfide solid electrolyte has at least a crystalline phase having an argyrodite-type structure. In the present invention, it is preferable that the sulfide solid electrolyte has a crystalline phase having an argyrodite-type structure as the main phase. The term "main phase" refers to a phase that occupies the largest proportion of the total amount of all of the crystalline phases constituting the sulfide solid electrolyte. Accordingly, the proportion of the crystalline phase having an argyrodite-type structure contained in the sulfide solid electrolyte to all of the crystalline phases constituting the sulfide solid electrolyte is, for example, preferably 60 mass % or more, or in particular, more preferably 70 mass % or more, 80 mass % or more, or 90 mass % or more. The proportion of a crystalline phase can be confirmed through XRD, for example.

The sulfide solid electrolyte of the present invention is in the form of powder, which is a collection of particles. From the viewpoint of improving the ionic conductivity, the cumulative volume particle diameter $D_{50}$ at a cumulative volume of 50 vol % of the sulfide solid electrolyte of the present invention as measured through particle size distribution analysis using a laser diffraction and scattering method is, for example, preferably 0.1 μm or more, more preferably 0.3 μm or more, and even more preferably 0.5 μm or more. On the other hand, the cumulative volume particle size $D_{50}$ of the sulfide solid electrolyte of the present invention is, for example, preferably 20 μm or less, more preferably 10 μm or less, and even more preferably 5 μm or less. It is preferable that the sulfide solid electrolyte has a cumulative volume particle size $D_{50}$ of 0.1 μm or more, because an excessive increase in the total surface area of the powder made of the sulfide solid electrolyte is restrained, and therefore, the occurrence of problems such as an increase in resistance and an increase in difficulty in mixing the sulfide solid electrolyte with an active material can be effectively restrained. On the other hand, it is preferable that the sulfide solid electrolyte has a cumulative volume particle size $D_{50}$ of 20 μm or less, because when, for example, the sulfide solid electrolyte of the present invention is used in a combination with another sulfide solid electrolyte, the sulfide solid electrolyte of the present invention can easily fit into gaps and the like of the other sulfide solid electrolyte. As a result, the contact points between the sulfide solid electrolytes increase, and the contact areas therebetween also increase, so that the ionic conductivity can be effectively improved.

The sulfide solid electrolyte of the present invention can be used, for example, as a material that constitutes a sulfide solid electrolyte layer, or in an electrode mixture that contains an active material and constitutes a sulfide solid electrolyte layer. Specifically, the sulfide solid electrolyte can be used in a positive electrode mixture that contains a positive electrode active material and constitutes a positive electrode layer, or in a negative electrode mixture that contains a negative electrode active material and constitutes a negative electrode layer. Therefore, the sulfide solid electrolyte of the present invention can be used in a battery having a solid electrolyte layer, or a so-called solid-state battery. More specifically, the sulfide solid electrolyte can be used in a lithium solid-state battery. The lithium solid-state battery may be a primary battery or a secondary battery, but it is particularly preferable that the sulfide solid electrolyte is used in a lithium secondary battery. Note that the term "solid-state battery" encompasses, in addition to a solid-state battery that does not contain any liquid substance or gel substance as the electrolyte, a battery that contains a liquid substance or a gel substance as the electrolyte in an amount of, for example, 50 mass % or less, 30 mass % or less, or 10 mass % or less.

The above-described solid-state battery has a positive electrode layer, a negative electrode layer, and a solid electrolyte layer located between the positive electrode layer and the negative electrode layer, and contains the sulfide solid electrolyte of the present invention. Examples of the shape of the battery include the shapes of laminate-type, cylindrical, and rectangular batteries.

The sulfide solid electrolyte layer of the present invention can be produced using, for example, a method in which a slurry containing the sulfide solid electrolyte, a binder, and a solvent is dripped onto a substrate and leveled off with a doctor blade or the like; a method in which the substrate and the slurry are brought into contact with each other, followed by cutting with an air knife; a method in which a coating is formed through screen printing or the like, and then the solvent is removed through heat drying; or other methods. Alternatively, the sulfide solid electrolyte layer can also be produced by pressing a powder of the sulfide solid electrolyte of the present invention and then performing appropriate processing. The solid electrolyte layer of the present invention may also contain another solid electrolyte, in addition to the sulfide solid electrolyte of the present invention. Typically, the thickness of the solid electrolyte layer of the present invention is preferably from 5 µm to 300 µm, and more preferably from 10 µm to 100 µm.

As the positive electrode mixture of the solid-state battery that contains the sulfide solid electrolyte of the present invention, for example, a material that is used as a positive electrode active material in a lithium secondary battery can be used as appropriate. Examples of such a positive electrode active material include a spinel-type lithium transition metal compound, a lithium metal oxide having a layered structure, and the like. Particles of the positive electrode active material may have on their surfaces a coating layer that can reduce the reaction resistance between the sulfide solid electrolyte and the positive electrode active material. However, according to the present invention, the reaction resistance between the sulfide solid electrolyte and an active material can be reduced without forming a coating layer on the surfaces of the active material particles, and there is no need to actively form a coating layer on the surfaces of the active material particles. The positive electrode mixture may also contain other materials, including a conductive assistant, in addition to the positive electrode active material.

As the negative electrode mixture of the solid-state battery that contains the sulfide solid electrolyte of the present invention, for example, a negative electrode mixture that is used as a negative electrode active material in a lithium secondary battery can be used as appropriate. Examples of such a negative electrode active material include lithium metals, carbon materials such as artificial graphite, natural graphite, and non-graphitizable carbon (hard carbon), silicon, silicon compounds, tin, tin compounds, and the like. The negative electrode mixture may also contain other materials, including a conductive assistant, in addition to the negative electrode active material.

EXAMPLES

Hereinafter, the present invention will be described in greater detail by means of examples. However, the scope of the present invention is not limited to the examples below. In the following description, "part" means "part by mass" unless otherwise specified.

Examples 1 to 4

(1) Production of Sulfide Solid Electrolyte

A $Li_2S$ powder, a $P_2S_5$ powder, a LiCl powder, and a LiBr powder were weighed so that the total amount of the powders was 75 g and the composition $Li_{5.4}PS_{4.4}Cl_{0.8}Br_{0.8}$ was realized. These powders were ground and mixed using a ball mill to obtain a powder mixture. The powder mixture was fired to obtain a fired product having the composition above. The firing was performed using a tubular electric furnace. During the firing, 100% pure hydrogen sulfide gas was circulated in the electric furnace at 1.0 L/min. The firing temperature was set to 500° C., and the firing was performed for 4 hours. The fired product was disintegrated using a mortar and a pestle, and subsequently ground using a wet bead mill to obtain a sulfide solid electrolyte. The obtained sulfide solid electrolyte was exposed to an atmosphere of air at (dew point-30°) C for 24 hours to produce $LiCl·H_2O$ and $LiBr·H_2O$, and an intended sulfide solid electrolyte was thus obtained. In Examples 2 to 4, a similar procedure to that of Example 1 was performed except that the exposure time was set to 48 hours, 64 hours, and 72 hours, respectively, and intended sulfide solid electrolytes were thus obtained.

FIG. 1 shows an XRD measurement result of the sulfide solid electrolyte obtained in Example 1. The inventors of the present invention confirmed that similar XRD measurement results to that of Example 1 were obtained for the sulfide solid electrolytes obtained in Examples 2 to 4 as well, although not shown in the drawings. The XRD measurement conditions were as follows:

Apparatus: Automated multipurpose X-ray diffractometer, SmartLab, manufactured by Rigaku Corporation
Tube voltage: 40 kV
Tube current: 30 mA
X-ray source: CuKα1
Incident optical element: Confocal mirror (CMF)
Incident slit configuration: Collimator size 1.4 mm×1.4 mm
Receiving slit configuration: Parallel slit analyzer 0.114 deg, Receiving slit 20 mm
Detector: Scintillation counter
Scan axis: 2θ/θ
Measurement range: 2θ=20 deg to 40 deg
Step width: 0.01 deg
Scan speed: 1 deg/min
Optics: Concentration method
Incident monochrometer: Johansson type
Non-exposed holder
Maximum intensity: 5,000 counts or more Peak intensity analysis was performed using PDXL2 (version 2.8.4.0). XRD data was loaded into PDXL2, "Data processing"–"Auto" and "Peak search"–"σ cut value 3.00" were selected, and then "Calculate and Establish" was clicked on. After that, "2θ (deg)" and "Height (counts)" displayed in "Peak list" were set to "Peak positions" and "Peak intensities", respectively. However, if a peak at a peak position that will be described later was decomposed into a plurality of peaks, editing ("Remove peaks" and "Add peaks") was performed so as to obtain a single peak, and, in the "Optimize" dialog under "Information", the "Refine the background" checkbox was unchecked, and then optimization was performed by clicking on "Execute". After that, the result displayed in "Peak list" was used.

In addition, the obtained sulfide solid electrolyte was subjected to thermogravimetry. TG-DTA2000SA manufactured by MAC Science was used for the measurement. The measurement was performed at a heating rate of 10° C./min in an Ar atmosphere.

(2) Production of Positive Electrode Mixture

A positive electrode mixture was prepared by using and mixing together 60 parts of $LiNi_{1/3}Co_{1/3}Mn_{1/3}O_2$, 37 parts of the sulfide solid electrolyte, and 3 parts of a conductive carbon material, and this positive electrode mixture was formed into a positive electrode layer.

(3) Production of Negative Electrode Mixture

A negative electrode mixture was prepared by mixing together 64 parts of a metal graphite powder and 36 parts of the sulfide solid electrolyte, and this negative electrode mixture was formed into a negative electrode layer.

(4) Production of Solid-State Battery

The positive electrode layer, a solid electrolyte layer, and the negative electrode layer were stacked in this order and press-formed to produce a solid-state battery.

Comparative Example 1

The sulfide solid electrolyte produced in Example 1 was used as is, or in other words, the sulfide solid electrolyte without being exposed was used as a sulfide solid electrolyte. After that, a similar procedure to that of Example 1 was performed.

Evaluation

For Examples 1 to 4 and Comparative Example 1, the 0.1C discharge capacity, the 5C discharge capacity, and the discharge capacity retention rate were measured using the following method. Table 1 shows the results.

0.1C Discharge Capacity, 5C Discharge Capacity, and Discharge Capacity Retention Rate For each of the solid-state batteries of the examples and the comparative example, a battery was placed into an environmental tester in which the environmental temperature at which the battery was to be charged and discharged was set to 25° C., preparations for charging and discharging were made, and the battery was then allowed to stand until the battery temperature reached the environmental temperature. The battery was charged and discharged with 1C being 1 mA. Then, a charging and discharging cycle of constant current-constant voltage charging up to 4.5 V at a 0.1C current value and subsequent constant current discharging down to 2.5 V at 0.1C was repeated three times, and the discharge capacity at the third cycle was measured.

Next, the battery was subjected to constant current-constant voltage charging up to 4.5 V at a 0.2C current value and subsequent constant current discharging down to 2.5 V at 5C, and the discharge capacity was then measured. The measured value was used as the 5C discharge capacity. A value obtained by dividing this 5C discharge capacity by the discharge capacity at the third cycle was taken as the 5C discharge capacity retention rate (%). The 5C discharge capacity retention rate was used as an indicator of rate characteristics. The temperature was set to 25° C.

TABLE 1

| | (Dew point-30)° C. Exposure time (h) | Peak A within 2θ = 20.0° to 24.0° | Peak B within 2θ = 24.4° to 26.4° | Peak intensity ratio $I_A/I_B$ | 0.1 C Discharge capacity (mAh/g) | 5 C Discharge capacity (mAh/g) | Discharge capacity retention rate (%) |
|---|---|---|---|---|---|---|---|
| Ex. 1 | 24 | Observed | Observed | 0.006 | 152.9 | 71.3 | 46.6 |
| Ex. 2 | 48 | | | 0.035 | 153.3 | 80.6 | 52.6 |
| Ex. 3 | 64 | | | 0.030 | 155.6 | 74.6 | 47.9 |
| Ex. 4 | 72 | | | 0.042 | 139.0 | 74.8 | 53.8 |
| Com. Ex. 1 | Not exposed | None | | 0.000 | 143.8 | 28.2 | 19.6 |

As is clear from the results shown in Table 1, it was found that the solid-state batteries in which the sulfide solid electrolytes obtained in the examples were used had high discharge capacities, and also had excellent rate characteristics, compared with the solid-state battery in which the sulfide solid electrolyte obtained in the comparative example was used.

Note that, when the sulfide solid electrolyte obtained in the comparative example was subjected to XRD measurement in a similar manner to those obtained in Examples 1 to 4, no diffraction peak A was observed within the range of 2θ=20.0° to 24.0°.

Reference Examples 1 and 2, Examples 5 and 6, and Comparative Examples 2 and 3

The present reference examples and the like were conducted for the purpose of confirming that a solid-state battery in which the sulfide solid electrolyte of the present invention is used achieves similar performance to a solid-state battery in which a positive electrode active material having a coating layer formed on its particle surfaces in order to reduce the reaction resistance is used.

A surface-coated positive electrode active material was prepared, the active material being composed of core particles that contained a lithium-containing complex oxide and a coating layer that was formed on the surfaces of the core particles and that contained Nb. Note that a lithium-containing complex oxide represented by $LiCo_{1/3}Ni_{1/3}Mn_{1/3}O_2$ was used as the core particles. A positive electrode mixture was prepared by using the above-described surface-coated positive electrode active material and the sulfide solid electrolyte of Comparative Example 1. After that, a similar procedure to that of Example 1 was performed, and a solid-state battery was thus obtained (Reference Example 1).

In addition, positive electrode mixtures were prepared by using the sulfide solid electrolytes of Example 1 and Comparative Example 1 and a positive electrode active material without a coating layer. After that, similar procedures to that of Example 1 were performed, and solid-state batteries were thus obtained (Example 5 and Comparative Example 2).

Furthermore, solid-state batteries were obtained using Si as the negative electrode active material, instead of graphite that was used in Reference Example 1, Example 5, and Comparative Example 2 (Reference Example 2, Example 6, and Comparative Example 3). More specifically, a negative electrode mixture was prepared by using and mixing together 47.5 parts of a Si powder, 47.5 parts of the sulfide solid electrolyte, and 5 parts of the conductive carbon material, and the prepared negative electrode mixture was formed into a negative electrode layer.

For each of the thus obtained solid-state batteries, the 0.1C discharge capacity, the 5C discharge capacity, and the discharge capacity retention rate were measured using the following method. Table 2 below shows the results.

0.1C Discharge Capacity, 5C Discharge Capacity, and Discharge Capacity Retention Rate For the solid-state batteries of Reference Example 1, Example 5, and Comparative Example 2, the discharge capacities and the discharge capacity retention rates were measured in a similar manner to that Examples 1 to 4 and Comparative Example 1. For the solid-state batteries of Reference Example 2, Example 6, and Comparative Example 3, each battery was placed into an environmental tester in which the environmental temperature at which the battery was to be charged and discharged was set to 60° C., preparations for charging and discharging were made, and the battery was then allowed to stand until the battery temperature reached the environmental temperature. The battery was charged and discharged with 1C being 3 mA. A charging and discharging cycle of constant current-constant voltage charging up to 4.5 V at a 0.1C current value and subsequent constant current discharging down to 2.5 V at 0.1C was repeated three times, and the discharge capacity at the third cycle was measured.

Next, the battery was subjected to constant current-constant voltage charging up to 4.3 V at a 0.2C current value and subsequent constant current discharging down to 2.5 V at 5C, and the discharge capacity was then measured. The measured value was used as the 5C discharge capacity. A value obtained by dividing this 5C discharge capacity by the discharge capacity at the third cycle was taken as the 5C discharge capacity retention rate. The 5C discharge capacity retention rate was used as an indicator of rate characteristics. The temperature was set to 60° C.

TABLE 2

| | XRD peaks | Positive electrode active material | Negative electrode active material | 0.1 C Discharge capacity (mAh/g) | 5 C Discharge capacity (mAh/g) | Discharge capacity retention rate (%) |
|---|---|---|---|---|---|---|
| Ref. Ex. 1 | None | With coating | Graphite | 152.4 | 91.3 | 59.9 |
| Ex. 5 | Observed | Without coating | Graphite | 145.9 | 74.0 | 50.7 |
| Com. Ex. 2 | None | Without coating | Graphite | 135.5 | 25.7 | 19.0 |
| Ref. Ex. 2 | None | With coating | Si | 164.8 | 84.7 | 51.4 |
| Ex. 6 | Observed | Without coating | Si | 168.1 | 99.4 | 59.1 |
| Com. Ex. 3 | None | Without coating | Si | 162.1 | 29.6 | 18.2 |

As is clear from the results shown in Table 2, a comparison between Example 5 and Reference Example 1 shows that the two batteries exhibit substantially similar charge and discharge characteristics. In addition, a comparison between Example 6 and Reference Example 2, which were the same as Example 5 and Reference Example 1, respectively, except only that the type of the negative electrode active material was different, also shows that the two batteries exhibit substantially similar charge and discharge characteristics. This means that, with the use of the sulfide solid electrolyte of the present invention, even when an expensive surface-coated positive electrode active material is not used, a high level of performance similar to that which can be achieved by using the surface-coated positive electrode active material can be realized.

Example 7

A $Li_2S$ powder, a $P_2S_5$ powder, a LiCl powder, and a LiBr powder were weighed so that the total amount of the powders was 75 g and the composition $Li_{5.4}PS_{4.4}Cl_{0.8}Br_{0.8}$ was realized. These powders were ground and mixed using a ball mill to obtain a powder mixture. The powder mixture was fired to obtain a fired product having the composition above. The firing was performed using a tubular electric furnace. During the firing, 100% pure hydrogen sulfide gas was circulated in the electric furnace at 1.0 L/min. The firing temperature was set to 500° C., and the firing was performed for 4 hours. The fired product was disintegrated using a mortar and a pestle, and subsequently ground using a wet bead mill to obtain a sulfide solid electrolyte.

The obtained sulfide solid electrolyte was mixed with $LiBr·H_2O$ in an Ar atmosphere to obtain an intended sulfide solid electrolyte. The amount of $LiBr·H_2O$ added was 10 mass % of the total amount of the sulfide solid electrolyte and $LiBr·H_2O$. Otherwise, a similar procedure to that of Example 6 was performed, and a solid-state battery was thus produced.

Example 8 and Comparative Examples 4 and 5

Solid-state batteries were produced in a similar manner to that of Example 7 except that the ratio of the amount of $LiBr·H_2O$ added with respect to the total amount of the sulfide solid electrolyte and $LiBr·H_2O$ was set to the values shown in Table 3.

FIGS. 2 to 5 show XRD measurement results of the sulfide solid electrolytes obtained in Examples 7 and 8 and Comparative Examples 4 and 5. In addition, the 0.1C discharge capacities of the solid-state batteries obtained in Examples 7 and 8 and Comparative Examples 4 and 5 were measured. Furthermore, the 5C discharge capacities and the discharge capacity retention rates of the solid-state batteries obtained in Examples 7 and 8 and Comparative Examples 4 and 5 were measured. Table 3 shows the results. The measurement method was the same as that of Example 5 described above.

TABLE 3

| | Amount of LiBr•H₂O added (mass %) | Peak A within 2θ = 20.0° to 24.0° | Peak B within 2θ = 24.4° to 26.4° | Peak intensity ratio $I_A/I_B$ | 0.1 C Discharge capacity (mAh/g) | 5 C Discharge capacity (mAh/g) | Discharge capacity retention rate (%) |
|---|---|---|---|---|---|---|---|
| Ex. 7 | 10 | Observed | Observed | 0.077 | 170.6 | 90.8 | 53.2 |
| Ex. 8 | 40 | | | 0.862 | 152.7 | 32.7 | 21.4 |
| Com. Ex. 4 | 0 | None | | 0.000 | 162.1 | 29.5 | 18.2 |
| Com. Ex. 5 | 60 | Observed | | 2.381 | 9.6 | 0.0 | 0.3 |

As is clear from the results shown in Table 3, it was found that the solid-state batteries in which the sulfide solid electrolytes obtained in Examples 7 and 8 were used had higher discharge capacities at 0.1C and 5C, and also had higher discharge capacity retention rates, compared with the solid-state batteries obtained in Comparative Examples 4 and 5.

INDUSTRIAL APPLICABILITY

According to the present invention, a sulfide solid electrolyte with which favorable battery characteristics can be obtained is provided.

The invention claimed is:

1. A sulfide solid electrolyte having: diffraction peak A observed within a range of 2θ=20.0° to 24.0°; and diffraction peak B observed within a range of 2θ=24.4° to 26.4°, diffraction peak A and diffraction peak B being observed by performing X-ray diffraction measurement using CuKα1 radiation,
a ratio of $I_A$ to $I_B$, $I_A/I_B$, being 0.006 or more and 1.0 or less, wherein $I_A$ is an intensity of diffraction peak A and $I_B$ is an intensity of diffraction peak B,
the sulfide solid electrolyte comprising elemental lithium (Li), elemental phosphorus (P), elemental sulfur (S), an elemental halogen (X), and elemental oxygen (O), and
the sulfide solid electrolyte comprising a compound having a compositional formula $Li_aPS_bX_c$, wherein a is from 3.0 to 6.5, b is from 3.5 to 5.5, and c is from 0.1 to 3.0.

2. The sulfide solid electrolyte according to claim 1, wherein the elemental halogen (X) is at least one of elemental chlorine (Cl) and elemental bromine (Br).

3. The sulfide solid electrolyte according to claim 1, comprising a crystalline phase that has an argyrodite-type crystal structure.

4. The sulfide solid electrolyte according to claim 1, comprising a lithium halide hydrate.

5. A sulfide solid electrolyte having: diffraction peak A observed within a range of 2θ=20.0° to 24.0°; and diffraction peak B observed within a range of 2θ=24.4° to 26.4°, diffraction peak A and diffraction peak B being observed by performing X-ray diffraction measurement using CuKα1 radiation,
a ratio of $I_A$ to $I_B$, $I_A/I_B$, being 0.006 or more and 1.0 or less, wherein $I_A$ is an intensity of diffraction peak A and $I_B$ is an intensity of diffraction peak B, and
the sulfide solid electrolyte comprising a lithium halide hydrate and a compound having a compositional formula $Li_aPS_bX_c$, wherein a is from 3.0 to 6.5, b is from 3.5 to 5.5, and c is from 0.1 to 3.0.

6. An electrode mixture comprising the sulfide solid electrolyte according to claim 1 and an active material.

7. A solid electrolyte layer comprising the solid electrolyte according to claim 1.

8. A solid-state battery comprising the solid electrolyte according to claim 1.

9. A solid electrolyte layer comprising the solid electrolyte according to claim 6.

10. A solid-state battery comprising the solid electrolyte according to claim 6.

* * * * *